(12) United States Patent
Golliver et al.

(10) Patent No.: US 6,378,067 B1
(45) Date of Patent: Apr. 23, 2002

(54) EXCEPTION REPORTING ARCHITECTURE FOR SIMD-FP INSTRUCTIONS

(75) Inventors: Roger Golliver, Beaverton, OR (US); Gautam Doshi; Sivakumar Makineni, both of Sunnyvale, CA (US)

(73) Assignee: Idea Corporation, Santa Clara, CA (US)

( * ) Notice: Subject to any disclaimer, the term of this patent is extended or adjusted under 35 U.S.C. 154(b) by 0 days.

(21) Appl. No.: 09/170,132

(22) Filed: Oct. 12, 1998

(51) Int. Cl.[7] .................................................. G06F 9/48
(52) U.S. Cl. ...................................... 712/244; 712/260
(58) Field of Search ................................. 712/244, 260

(56) References Cited

U.S. PATENT DOCUMENTS 6,038,652 A * 3/2000 Phillips et al. ................. 712/22
6,058,469 A * 5/2000 Baxter ........................... 712/43

* cited by examiner

*Primary Examiner*—David Y. Eng
(74) *Attorney, Agent, or Firm*—Blakely, Sokoloff, Taylor & Zafman LLP (57) ABSTRACT

A method and apparatus to handle exceptions. The method receives and prioritizes exceptions resulting from executing an instruction on different elements of an operand. The exceptions are reported to an interrupt service register which communicates the exceptions to an exception handler to effectively process the exceptions.

17 Claims, 7 Drawing Sheets

|  | 104 | 108 |
|---|---|---|
| 112 FAULTS | INVALID | INVALID |
|  | DIVIDE BY ZERO | DIVIDE BY ZERO |
| 116 TRAPS | OVERFLOW/ UNDERFLOW | OVERFLOW/ UNDERFLOW |
|  | INEXACT | INEXACT |

TABLE 1

EXCEPTION REPORTING ARCHITECTURE FOR SIMD-FP INSTRUCTIONS

BACKGROUND OF THE INVENTION

1. Field of the Invention

The present invention relates to computer systems. In particular, the invention describes an improved method for handling exceptions generated in a processing system.

2. Background Information

The increased use of graphics and sound in computer applications has resulted in a substantial increase in the amount of data that modem computer systems, particularly multi-media personal computers handle. Many of these computer systems have implemented a single instruction, multiple data (SIMD) architecture to improve the efficiency of multi-media applications, as well as other applications with similar characteristics. SIMD architectures enable one instruction to operate on several operands simultaneously, rather than on a single operand. In particular, SIMD architectures take advantage of packing many data elements or segments within one register or memory location. With parallel hardware execution, multiple operations can be performed on separate data elements with one instruction, resulting in a significant performance improvement.

In many graphics applications, specifically three-dimensional ("3D") graphics applications, there are manipulations of scenes that have objects such as triangles and polygons which are rotated, scaled, etc. The range of numbers in, for example, a 32-bit register is from zero to $(2^{32}-1)$. However, in many instances, the values of the objects may need to be represented by a floating point number because a bigger number range is required or the number is not a whole number (e.g., due to the introduction of angles). Therefore, these values must be converted to floating point numbers and moved to the floating point registers.

Computations in floating point (FP), unlike computations in integers can result in exceptions. Such exceptions are defined by the American National Standards Institute (ANSI) and Institute of Electrical and Electronic-Engineers (IEEE) in ANSI/IEEE standard No. 754-1985 approved July of 1985, hereinafter IEEE standard. Each element of an operand processed may produce one or more exceptions. Because SIMD processes multiple data elements of an operand, the processing of floating point data using a circuit based on SIMD architecture may result in multiple interrupts or "exceptions" issued by the processor. Exceptions are interrupts that originate in the processor itself. The cause of an exception is generally an internal processor error caused by software that can no longer be handled by the processor alone.

Exceptions include fault exceptions and trap exceptions. Fault exceptions, or "faults," are exceptions which are issued prior to completing an instruction. Thus, a fault exception prevents a result from being computed for an operation or instruction. In some instances, faults can be detected prior to the starting of the computation. Traps exceptions, or "traps," are issued after completion of an instruction. Traps indicate that an instruction has been executed but that the program should be interrupted to check or correct certain parameters, including possibly the result produced by execution of the instruction.

When a single instruction operates on several data elements simultaneously, several exceptions may be simultaneously produced. Current computer designs do not efficiently handle the multiple exceptions that are produced. Such systems typically (1) slow the system down to handle the exceptions, and/or (2) do not meet Institute of Electrical and Electronic Engineers (IEEE) floating-point standards, specifically IEEE standard No. 754-1985 approved in 1985, for exception reporting.

Thus, an improved method and apparatus for handling multiple exceptions generated during an SIMD operation is needed.

SUMMARY OF THE INVENTION

A method of handling operations on at least one operand having a first data element and a second data element is described. An operation is performed on the first data element and the occurrence of a first exception detected. The operation is also performed on the second data element and the occurrence of a second exception is detected. The occurrence of the first exception and the second exception are communicated to the exception handler prior to the processing of either the first or the second exception.

DETAILED DESCRIPTION

The invention is a method and apparatus to handle multiple exceptions produced in a SIMD architecture system. In one embodiment of the invention, the exceptions are faults and traps produced by a processor such as an arithmetic logic unit. By properly prioritizing and reporting the faults and traps which occur, a prioritizer circuit enhances the speed of the processor processing the SIMD operations while maintaining conformance with IEEE standards.

The detailed description will include certain details and describe particular components. The details of the description are provided to provide an understanding of the invention. However, those skilled in the art will appreciate that the invention may be practiced without these specific details and that other embodiments including other well-known methods, procedures, components, and circuits which are not described in detail can be used to implement the described invention. Thus, the details presented in this description should not be used to limit the invention to only the embodiments described.

Principles of Operation

Figure 1:
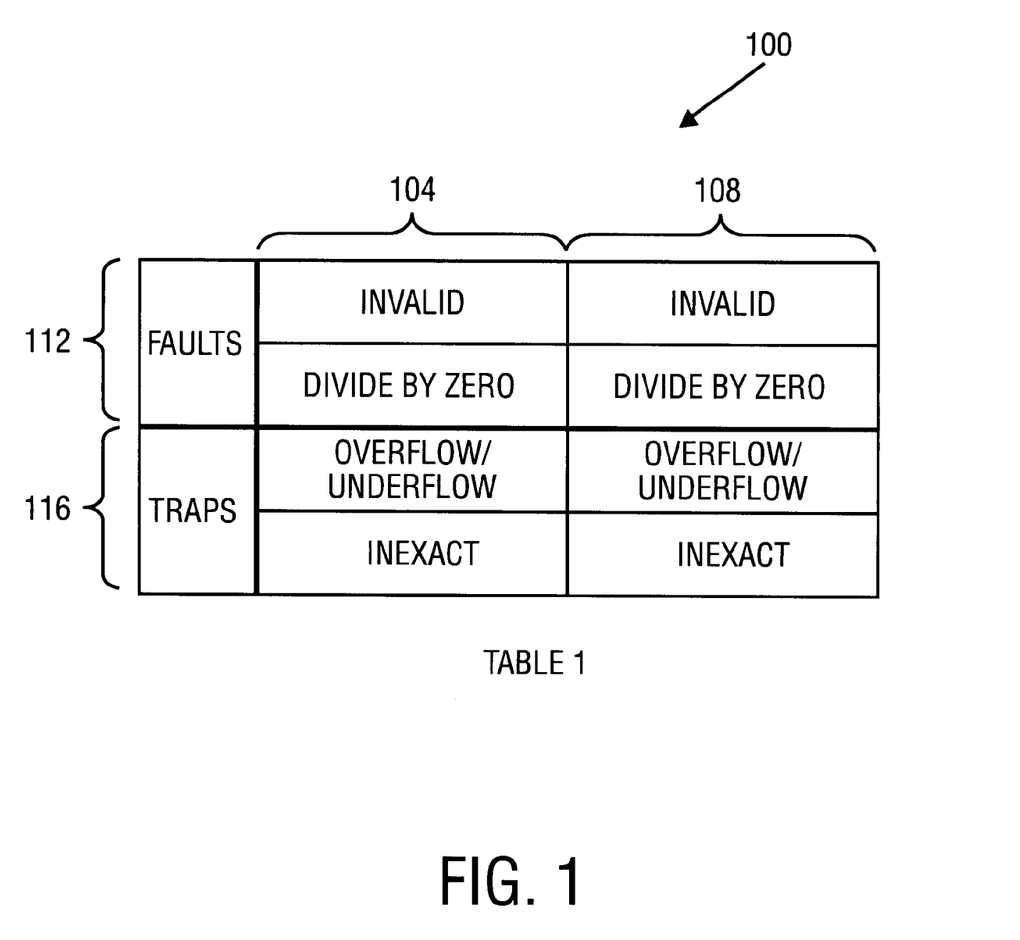
FIG. 1 is a table illustrating prioritization of exception types according to one embodiment of the invention.

FIG. 1 is a table 100 illustrating the exceptions which may be processed by one embodiment of the present invention. In the table 100, columns 104, 108 contain exceptions which may be produced by a system with two data flows. A data flow is defined to be a set of exceptions produced by executing an instruction on one element of an operand. An operand element in one embodiment is an element of a packed operand such that one packed operand may include several operand elements. Two data flows are shown for purposes of illustration. Additional data flows may be added. In table 100, higher priority exceptions are positioned higher in the column than lower priority exceptions.

Faults 112 are high priority exceptions which typically can be detected prior to completion of an instruction. Thus, when a fault occurs, the instruction producing the fault typically is not executed and no "result" is produced. In alternate embodiments, the instruction is executed but the result is not used and the destination is not updated. During a fault, the instruction pointer which indicates the instruction to be executed does not advance, thus the instruction pointer remains pointing at the instruction which produces the fault.

When a fault occurs, a fault handler circuit handles the fault by transferring control to a system handler. Different applications implement different procedures for handling a fault, thus often the system handler interfaces with an application specific operating system handler to correct the fault before processing continues. Transferring control to the system handler and returning control to the processor requires significant overhead time; thus, such transfers are preferably minimized.

Typically, faults may be detected by inspecting the input operands. Examples of typical faults include, but are not limited to, invalid and division by zero. In one example, an invalid fault is caused when a function is evaluated outside its domain, for example $Sin(X)/X$ when $X=0$. A division by zero fault is typically caused when an instruction results in an operation that is not mathematically defined, such as an attempt to process a division computation where the divisor equals zero and the dividend is finite and non-zero.

In the embodiment of the invention shown in table 100, traps 116 have a lower priority than faults 112. Traps exceptions are typically issued after completion of an instruction which causes the trap. Thus, when a trap issues, an instruction result is also produced and a destination is updated. When a trap is produced, the instruction pointer typically points to the instruction immediately following the instruction that gave rise to the trap exception. Thus, the instruction which produces the trap is typically not re-executed. Traps issue when instructions execute correctly but the program should nevertheless be interrupted. Examples of typical traps 116 illustrated in the table 100 include overflow, underflow, and inexact. An overflow occurs when the value of the result of an instruction exceeds the value which can be represented by the registers which store the result. Often in such cases, the registers which store the result will be set to a maximum value. An underflow occurs when the value of the result is less than the minimum value which can be stored by the registers. An inexact fault is caused when an operation produces a result which is imprecise due to rounding or other approximations.

In one embodiment of the present invention, the IEEE standard prioritization scheme for handling exception is maintained for each data flow (defined to be the exceptions generated by an instruction operating on one data element) in SIMD operations. A SIMD operation typically executes an instruction on a plurality of data elements of one operand. Each data element corresponds to a data flow to produce a corresponding result. For convenience, subsequent descriptions of the invention will describe two data flows. However, it should be understood that the number of data flows can be increased to three or more.

When one operation on one data unit produces several exceptions in a data flow, the exceptions are preferably prioritized by the IEEE standard for binary floating point arithmetic approved by the IEEE standards board and the American National Standards Institute (ANSI), also known as ANSI/IEEE standard No. 754-1985 approved in July of 1985 (hereinafter "IEEE standard"), hereby incorporated by reference.

Figure 2A:
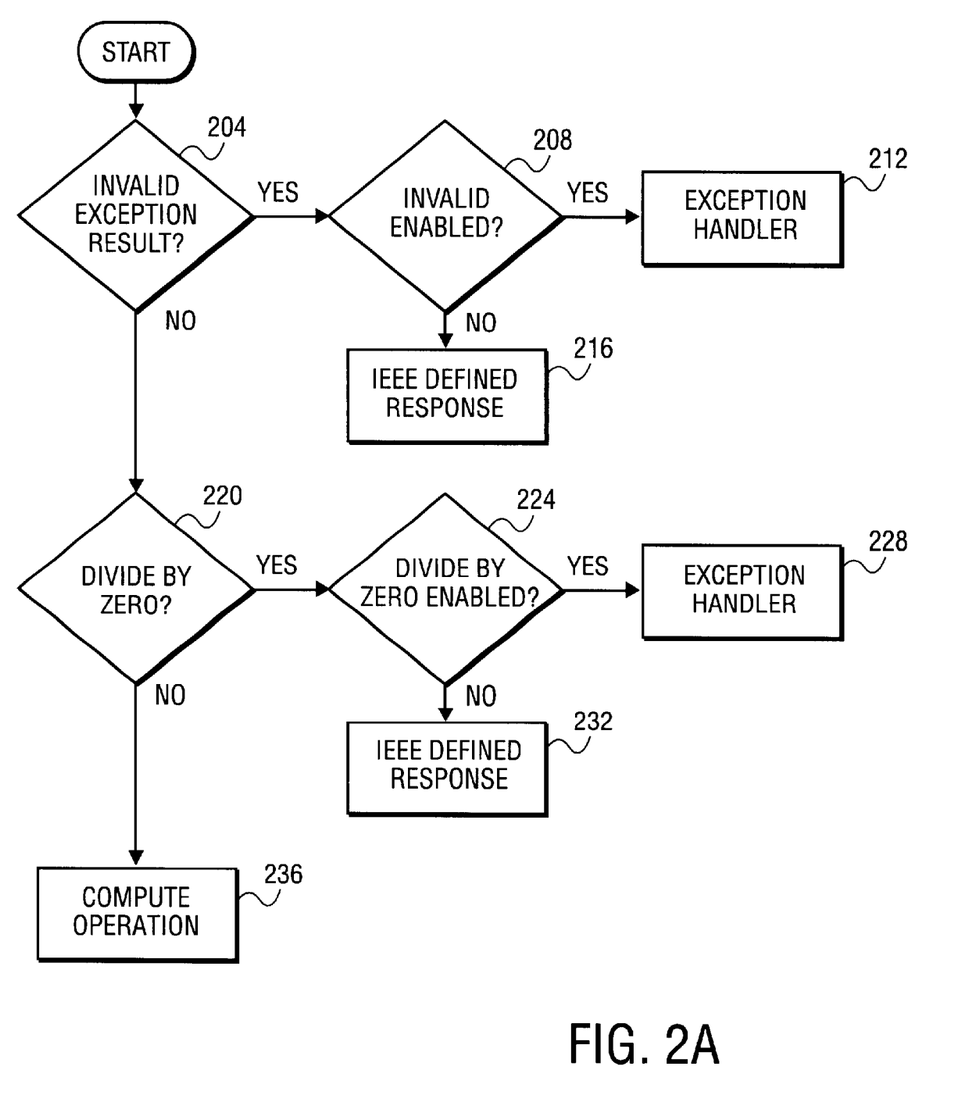
FIG. 2A and FIG. 2B are flow diagrams illustrating a technique for prioritizing a data flow in one embodiment of the invention.
Figure 2B:
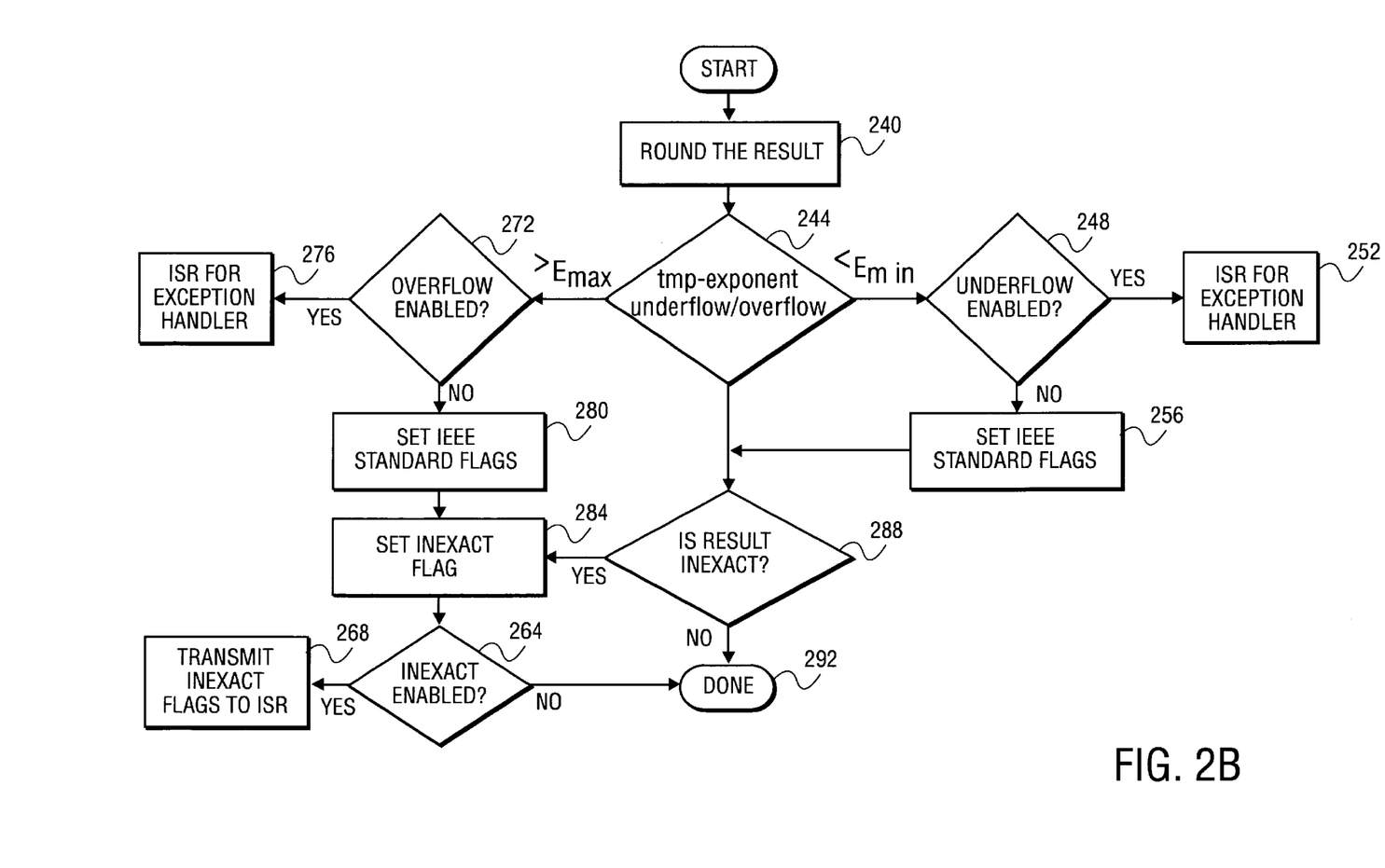

FIG. 2A and FIG. 2B are flow diagrams which illustrate handling of exceptions within each data flow. Multiple exceptions may result from processing one data element of an operand, for example, an overflow trap and an inexact trap may both result from the same instruction on the same element of an operand. Thus, a prioritization scheme that conforms to IEEE standards is illustrated in FIG. 2.

FIG. 2A illustrates the prioritization under IEEE standards for one data flow. It is understood that in alternative embodiments of the invention, extensions of the IEEE standards such as denormal operands may be implemented. In block 204 a fault detection circuit determines whether an invalid exception would result if an instruction were executed on a data element. When an invalid exception is detected in block 204, system circuitry determines whether invalid exceptions are enabled in block 208. When an invalid exception occurs and invalid exceptions are enabled, the exception handler indicates the presence of the fault to an interrupt service register (ISR). An exception handler processes the exceptions in the ISR in block 212. The exception handler may be implemented in hardware, firmware or software to service the exception which are produced. If invalid exceptions are not enabled in block 208, an IEEE defined response to handling an invalid exception is executed in block 216.

When an invalid fault is not detected, the prioritization circuit determines in block 220 whether a divide by zero fault would result if the instructions were executed. If a divide by zero fault is detected in block 220, and divide by zero exceptions are enabled in block 224, a flag indicating that a divide by zero fault occurred is stored in the ISR in block 228. The exception handler handles the divide by zero fault. If divide by zero faults are not enabled in block 224, the divide by zero error may be handled in accordance with IEEE standards in block 232. When neither an invalid operation nor a divide by zero fault occurs, the processing unit, such as an aritmetic logic unit (ALU), processes the operands with the instruction to generate a result in block 236.

The prioritization of traps in a data flow is illustrated in FIG. 2B. The result computed in block 236 of FIG. 2A is typically computed using infinite precision that is then rounded in block 240 to a required precision, but the range is kept unbounded. A resultant exponent is a temporary exponent that is later checked to determine if the result is within acceptable bounds. A temporary exponent generated in the computation of the result indicates whether an underflow or an overflow occurs in block 244.

When the temporary exponent is less than a minimum value which can be represented, an underflow occurs. When underflow exceptions are enabled in block 248, a flag indicating the underflow is transmitted and stored in the interrupt service register (ISR) in block 252 for the exception handler to process. If underflow exceptions were not enabled in block 248, the result is processed in block 256 to indicate whether rounding resulted in an inexact result. In block 288, error detection circuitry also determines whether an inexact result occurred. When an inexact result occurs, an inexact flag is set in block 284. When inexact exceptions are enabled in block 264, the inexact flags are also transmitted to the ISR in block 268.

The error detection circuit (see reference numbers 418, 420, 432, 434 of FIG. 4) also determines when an overflow occurs. The IEEE standard defines overflow and underflow, as well as other exceptions. However, for the illustrated embodiment, the processing circuit will be described as testing for underflow and overflow by comparing a temporary exponent with a maximum and minimum value. In block 244 when the temporary exponent is larger than a maximum value, an overflow exception is indicated. When overflow exceptions are enabled in block 272, the overflow is indicated to the ISR in block 276 which sets the appropriate flags for processing by an exception handler. When overflow exceptions are not enabled, the overflow is processed via IEEE or other default standards in block 280 and a flag to indicate that the result is inexact is set in block 284 prior to determining whether inexact exceptions are enabled in block 264. When inexact exceptions are enabled in block 264, the appropriate ISR flags are set for the exception handler in block 268.

When in block 244 it is determined that neither an underflow nor an overflow occurred, the priority processor determines whether the operation of block 240 resulted in an inexact exception in block 288. When an inexact exception occurs, the flag indicating an inexact number is set in block 284. When inexact exceptions are enabled in block 264, the ISR uses flags to indicate the inexact exception in block 268 for the exception handler to process. When an underflow, an overflow or an inexact trap does not occur, the result is completed and no exception handling is needed in block 292.

In the SIMD system where two or more data flows are occurring, each data flow is individually prioritized to meet IEEE standards as described in FIG. 2. In one embodiment of the invention, individual fault and trap detectors prioritize the exceptions in each data flow. A combined prioritization circuit combines and prioritizes the exception from several data flows and forwards the exceptions to an exceptions handler. In one embodiment of the invention, the prioritization circuit is designed to handle the multiple exceptions which may be produced simultaneously from a plurality of data streams in a SIMD operation and prioritizes the exceptions to minimize the delays used to handle the exceptions, thereby maximizing the overall speed of the system or circuit.

Figure 3:
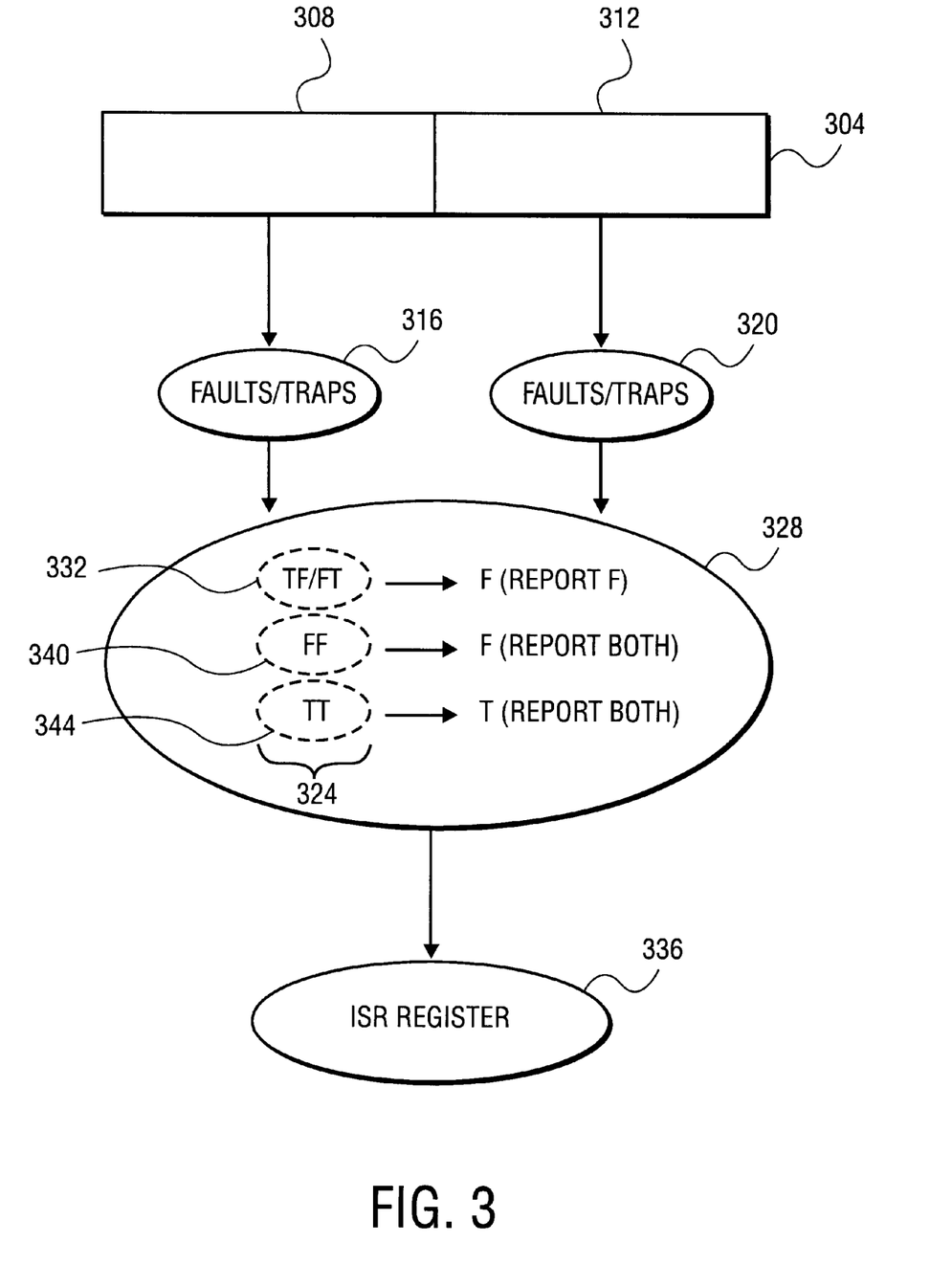
FIG. 3 illustrates the handling of traps and faults in one embodiment of the invention.

FIG. 3 illustrates the processing of two data elements of an operand using one instruction to produce two results. In FIG. 3, an operand 304 including first data element 308 and second data element 312 are processed by an instruction. Data elements 308, 312 of operand 304 may produce data flows 316, 320 containing multiple fault and/or trap exceptions.

Data flow 316 illustrates the faults/traps which may be produced by an instruction operating on the first data element, and data flow 320 illustrates the faults/traps which may be produced by the instruction operating on second data element 312. The resulting possible combination of faults and traps from data flow 316 and data flow 320 are illustrated in column 324 of a conceptual prioritizer 328. When a fault is produced by one data element and a trap is produced by a different data element, conceptual prioritizer 328 only reports the faults as illustrated in row 332. These faults are reported to interrupt service register (ISR) 336 which stores flags to indicate the type of fault. The ISR is divided into regions which store the flags corresponding to each data element such that an exception handler can determine which element of the operand produced the fault. The fault may then be handled by the operating system or fault handler circuitry coupled to instruction service register (ISR) 336.

In one embodiment of the invention, exceptions from each data flow are independently prioritized according to IEEE standards. A prioritizer then prioritizes and reports the two sets of exceptions. When both data flow 316 and data flow 320 produce faults, as illustrated in row 340, both faults are reported to ISR 336. In order to process a fault, typically the system is stopped and control is given to the exceptions handler. Stopping the system and changing control to the exception handler requires significant overhead time. Reporting of both faults to the ISR allows the system handler or an exceptions handler to process both faults without stopping the system twice, one for each fault, and using additional overhead time. Thus, "streaming" the faults allows the first fault from the first data flow and a second fault from the second data flow to be handled without the overhead of returning control to the system before processing of the second fault. Likewise, if two traps are produced as illustrated in row 344, both traps are reported to ISR 336 allowing the traps to be processed together without changes in control.

Implementation of Invention

Figure 4:
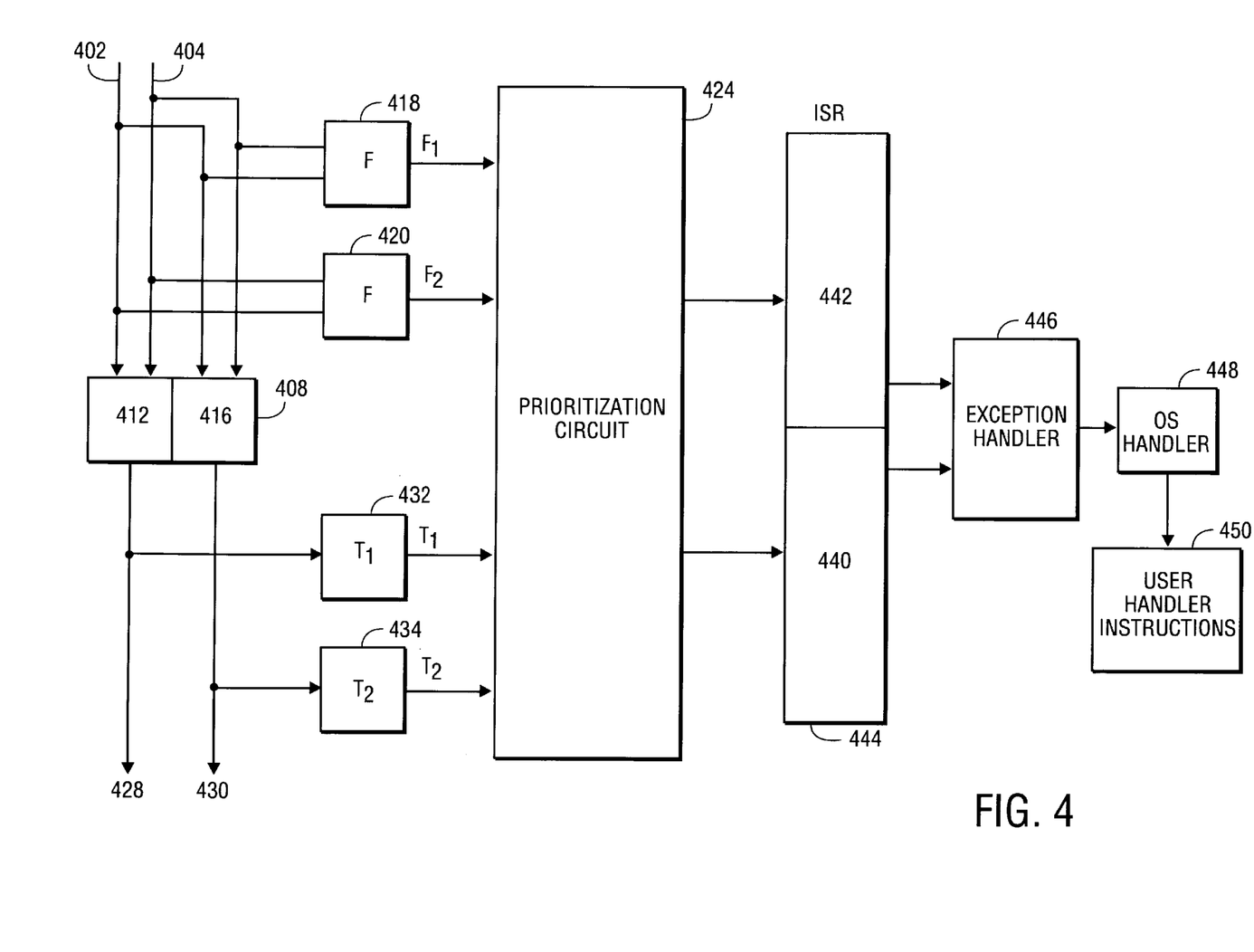
FIG. 4 is a block diagram illustrating the circuitry used to process multiple traps and faults from two data elements in one embodiment of the invention.

FIG. 4 illustrates one embodiment of a circuit for processing SIMD operations using one embodiment of the present invention. In FIG. 4, a plurality of input lines 402, 404 are used to transfer a plurality of operands, one operand on each input line 402, 404 to a processor such as an arithmetic logic unit (ALU) 408. A first section 412 of arithmetic logic unit (ALU) 408 processes the first elements of operands and a second section 416 of ALU 408 processes second data elements of operands transferred on input lines 402, 404.

In the embodiment illustrated in FIG. 4, fault detectors 418, 420 receive signals from the input lines 402, 404. One fault detector 418 detects faults by receiving the one element of the operand while a second fault detector 420 detects faults by reviewing a different element of the operand transferred along input lines 402, 404. In one embodiment of the invention, fault detectors 418, 420 detect the faults before processing of the data by ALU 408. Thus, the instruction which causes the fault in the corresponding sections 412, 416 of ALU 408 is not executed. Instead, fault detectors 418, 420 each prioritize faults which occur in the respective data elements or data flow according to IEEE standards. When only one element of an operand generates a fault, the other elements of the operands are processed by the ALU 408 to allow the circuit to make maximum forward progress each clock cycle. After appropriately prioritizing the faults that occur in the respective sections by IEEE standards, fault detectors 418, 420 forward the respective faults to prioritization circuit 424.

When at least one element of the operands does not produce a fault, ALU 408 processes the non-faulting elements and transmits the result along output lines 428, 430. Output line 428 transmits the result of ALU first section 412 and output line 430 transmits the result of the ALU second section 416. Trap detectors 432, 434 detect the results output by lines 428, 430 to determine whether any traps resulted from the execution of the instruction. In one embodiment of the invention, trap detector 432 detects traps which occurred in the first section 412 of ALU 408 and trap detector 434 detects traps which occurred in ALU second section 416. Each trap detector 432, 434 prioritizes traps which occur in the corresponding section according to the prioritization scheme set forth in FIG. 2 under IEEE standards. After prioritization within a data flow, the traps detected by trap detectors 432, 434 are transferred to prioritization circuit 424 for prioritization with all traps produced by all data flows.

Prioritization circuit 424 processes the faults and traps received from fault detector 418, 420 and trap detector 432, 434. The prioritization circuit matches the faults and traps of each section 412, 416 to flags. The interrupt service register (ISR) 444 stores the flag which indicates the faults and traps in corresponding sections 440, 442 of the ISR.

In one embodiment of the invention, the prioritization circuit uses the contents stored in the ISR 444 to determine which faults and traps to report to exception handler 446. Specifically, when faults and traps have been report for a particular instruction, only the faults are reported. The faults may be reported in parallel or the faults may be reported sequentially. However, in one embodiment of the invention, once the exception handler takes control of the system, which typically utilizes a significant amount of overhead time, at least one fault from each element of the operand that issued a fault is processed before control of the system returns to a "normal" operating mode and the ALU 408 continues processing of the operands. Simultaneously processing of faults, or sequentially processing faults resulting from different elements of the operand (faults from different data flows) before returning control to a normal operating mode saves significant amounts of processing time. In one embodiment of the invention, the exception handler may further transfer control to the operating system handler 448 or a user handler instruction set 450 to process faults in which processing instructions are customized by an application.

Likewise, when a plurality of traps is reported, the reported traps are stored in the interrupt status register 444 for processing by exception handler 446. Again, the simultaneous processing of traps or rapid sequential processing of at least one trap from each data flow that produced a trap before returning the system to a normal mode saves significant overhead clock time resulting in higher data speeds.

Figure 5A:
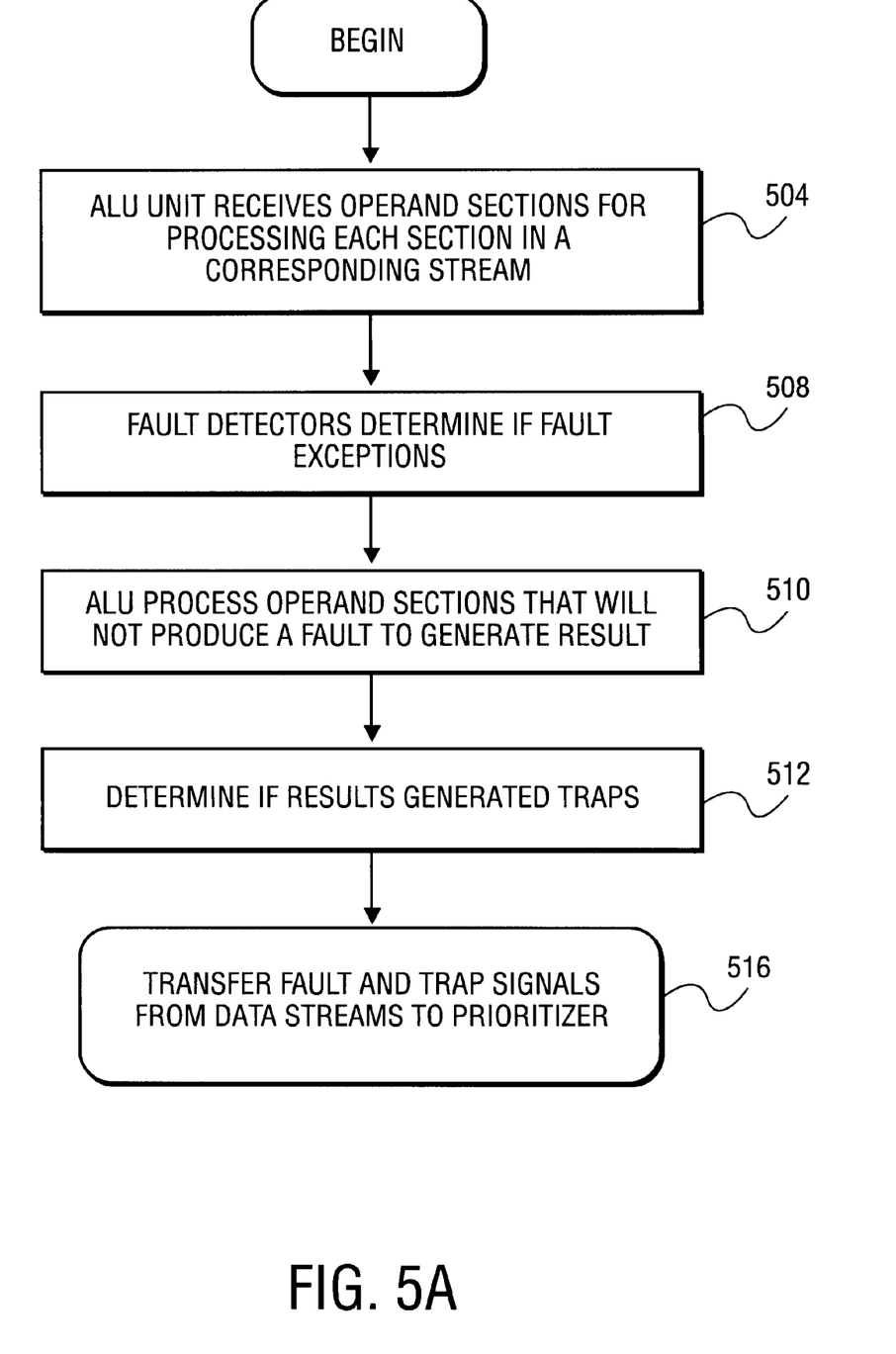
FIG. 5A and FIG. 5B are a flow diagrams illustrating a prioritization system to handle multiple exceptions from multiple data flows in one embodiment of the invention.
Figure 5B:
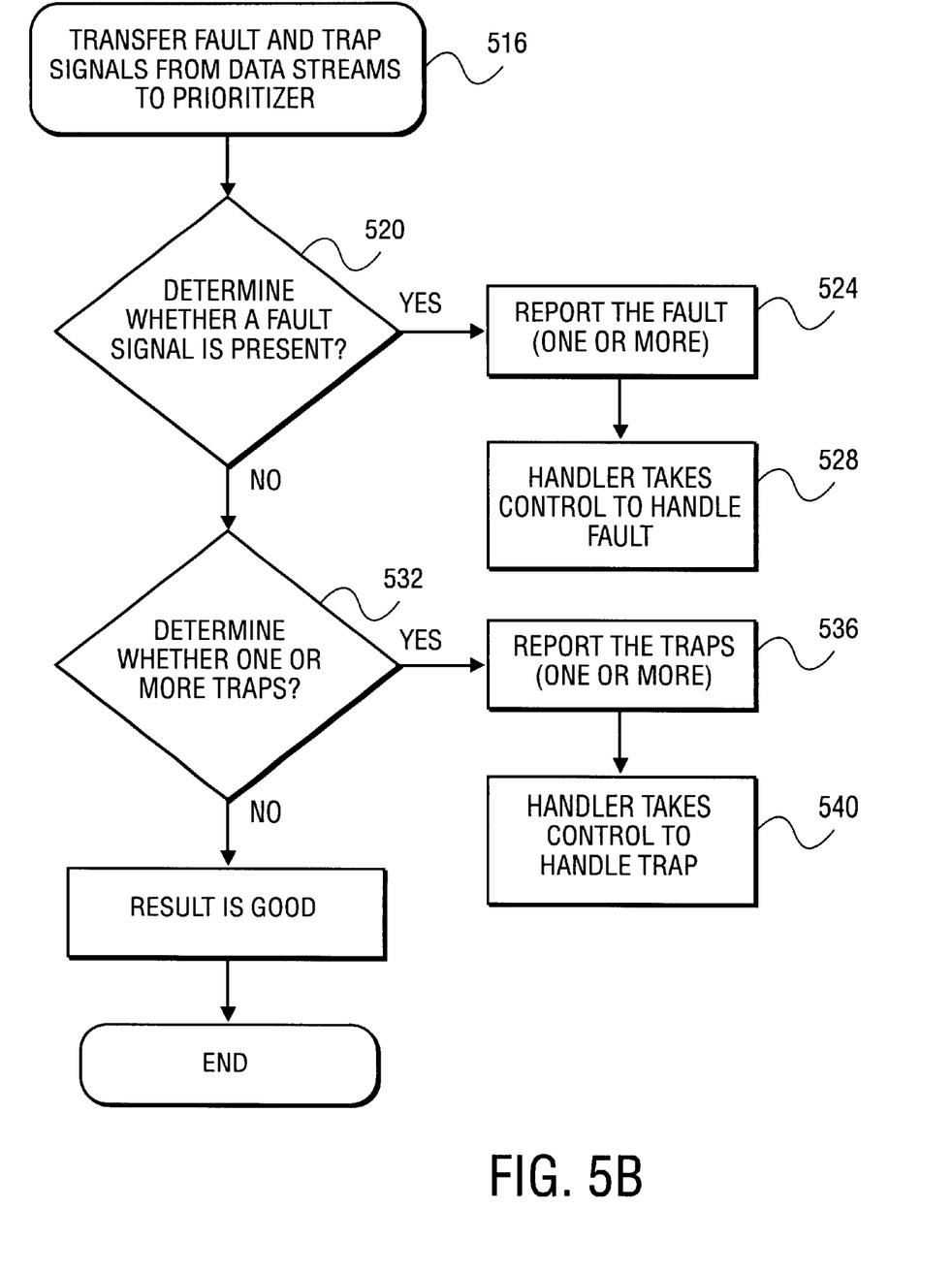

FIGS. 5A and 5B illustrate a flow diagram illustrating one embodiment of the invention to process exceptions. In block 504, the ALU unit receives elements of operands for processing. In block 508, the fault detectors determine whether there are faults in the segments of operands being input into the ALU unit. The ALU unit processes the elements of operands which do not generate a fault in block 508. Trap detectors in block 512 determine whether the generated results from block 508 resulted in traps. The traps and faults from trap detectors and fault detectors are received by a prioritization circuit in block 516.

In block 520, the prioritization circuit determines whether a fault was reported by any of the fault detectors. If at least one fault was reported by a fault detector in block 520, the faults corresponding to all data elements which reported a fault are indicated in block 524 via flags in an ISR. Control is then turned over to the exception handler to handle all faults indicated in the ISR in block 528.

When no faults were reported in block 520, the prioritization circuit determines whether at least one trap was reported in block 532. When at least one trap was reported in block 532, the prioritizer prioritizes and stores flags indicating the traps in corresponding sections of the ISR in block 536. The exception handler uses information stored in the ISR to process the traps in block 540. When in block 532 no traps are detected, the result of the operations are reported and no exceptions need be reported.

The described system for reporting exceptions from multiple data flows to the exception handler in a prioritized order increases the speed and efficiency of processing exceptions from SIMD operations.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of handling operations on at least one operand having at least two data elements including a first data element and a second data element, the method including:

performing a first operation on the first data element;

detecting an occurrence of a first plurality of exceptions in the first operation on the first data element;

performing a second operation on the second data element;

detecting an occurrence of a second plurality of exceptions in the second operation on the second data element;

prioritizing the first and second plurality of exceptions; and communicating to an exception handler the occurrence of the first and second plurality of exceptions for processing in accordance with priority.

2. The method of claim 1 further including transmitting a first set of flags corresponding to the operation on the first data element to a first part of an interrupt service register and transmitting a second set of flags corresponding to the operation on the second data element to a second part of the interrupt service register prior to the communicating to the exception handler the occurrence of the first and second plurality of exceptions.

3. The method of claim 1 wherein the performing of the first operation on the first data element and the second operation on the second data element occur in parallel.

4. The method of claim 1 wherein the first and second plurality of exceptions include faults.

5. The method of claim 1 wherein the first and second plurality of exceptions include traps.

6. The method of claim 1 wherein the operation performed is a single instruction multiple data floating point instruction.

7. An apparatus for handling a packed operand including at least a first data element and a second data element, the first and second data elements having a common single instruction associated therewith, the apparatus including:

a first detector to detect exceptions that would arise if the common single instruction were executed on the first data element of the packed operand;

a second detector to detect exceptions that would arise if the common single instruction were executed on the second data element of the packed operand;

a prioritization circuit to generate flags corresponding to the detected exceptions and to prioritize said flags; and an exception handler to process the detected exceptions based on the prioritized flags.

8. The apparatus of claim 7 wherein the detected exceptions are fault exceptions.

9. The apparatus of claim 7 wherein the detected exceptions are trap exceptions.

10. The apparatus of claim 7 wherein the first detector and the second detector are fault detectors.

11. The apparatus of claim 7 wherein the first detector and the second detector are trap detectors.

12. An exception handler including:

an interrupt status register having a first status location and a second status location;

a first circuit to receive a first exception resulting from a first operation on a first data element of a packed operand;

a second circuit to receive a second exception resulting from a second operation on a second data element of the packed operand, the first exception and the second exception being generated in parallel by the first and the second operations that are performed responsive to a common single instruction; and a third circuit coupled to the first and second circuits, the third circuit to generate a first flag and a second flag corresponding to the first exception and second exception respectively, to store the first flag in the first status location and the second flag in the second status location and to prioritize the flags stored in the status register.

13. The apparatus of claim 12 wherein the exceptions are trap exceptions.

14. The apparatus of claim 12 wherein the exceptions are fault exceptions.

15. A method of handling operations on at least one operand having at least two data elements including a first data element and a second data element, the method including:

performing a first operation on the first data element;

detecting an occurrence of a first plurality of exceptions in the first operation on the first data element;

prioritizing the first plurality of exceptions, a first exception having the highest priority in the first plurality of exceptions;

performing a second operation on the second data element in parallel with the performing of the first operation on the first data element, the first and second operations being identical and being performed responsive to a common single instruction;

detecting an occurrence of a second plurality of exceptions in the second operation on the second data element;

prioritizing the second plurality of exceptions, a second exception having the highest priority in the second plurality of exceptions; and communicating to an exception handler the occurrence of the first plurality of exceptions and the second plurality of exceptions prior to the exception handler processing either the first plurality of the exceptions starting with the first exception or the second plurality of the exceptions starting with the second exception.

16. The apparatus of claim 15 wherein the plurality of exceptions is the plurality of trap exceptions.

17. The apparatus of claim 15 wherein the plurality of exceptions is the plurality of fault exceptions.

* * * * *